Figure 1:
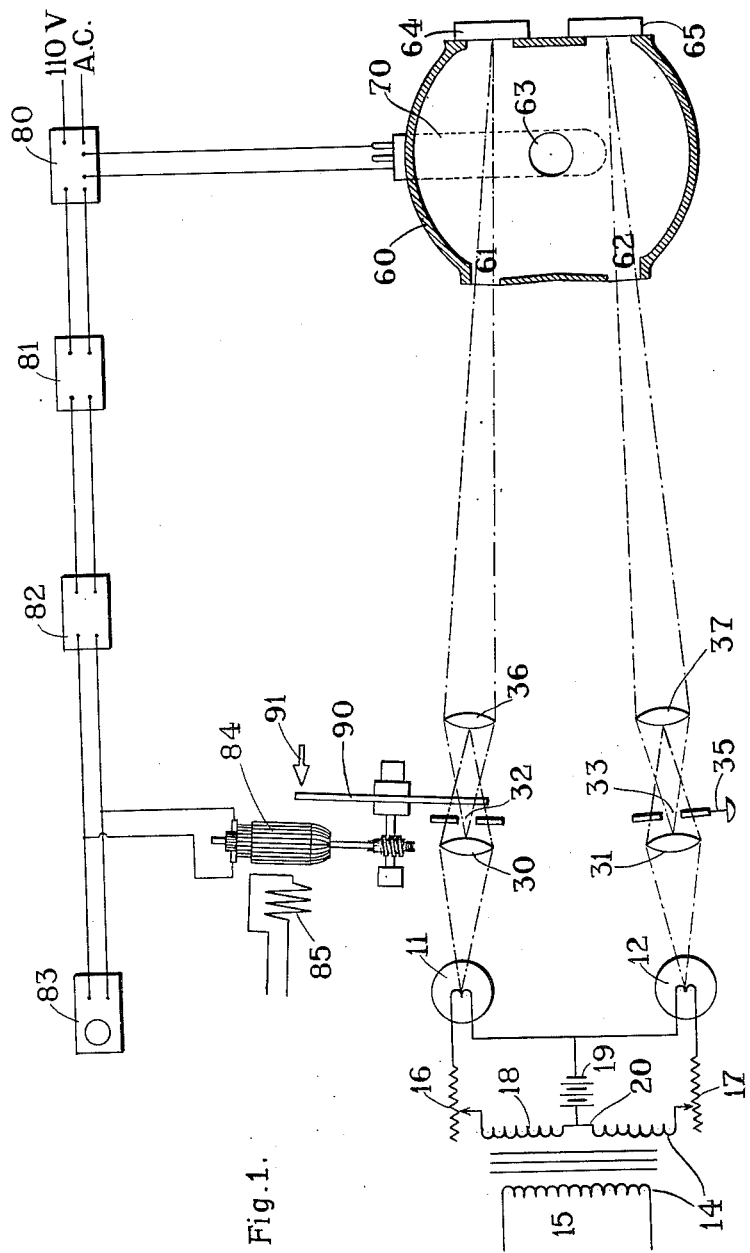

June 17, 1952  J. E. TYLER  2,601,182
PHOTOMETRIC APPARATUS
Filed April 23, 1949  2 SHEETS—SHEET 2

INVENTOR.
John E. Tyler
BY Eric E. Franke
ATTORNEY

Patented June 17, 1952

2,601,182

UNITED STATES PATENT OFFICE 2,601,182

PHOTOMETRIC APPARATUS

John E. Tyler, Riverside, Conn., assignor to Interchemical Corporation, New York, N. Y., a corporation of Ohio Application April 23, 1949, Serial No. 89,276

8 Claims. (Cl. 250—205)

This invention relates to photometric instruments and more particularly to photometric devices employing matched pairs of modulated lamps, operated in a manner to enable quick and accurate measurements of the reflection or transmission characteristics of a sample relative to a standard.

Most of the prior devices for the measurement of light according to modern scientific knowledge are based on the principle of producing a beam of light, and splitting and modulating the beam by optical or mechanical means before or after splitting. Such devices are costly and require a high degree of technical perfection in construction and operation. They fail to answer the commercial requirement for relatively simple and inexpensive instruments permitting speedy and accurate measurements of light characteristics.

It is the object of the present invention to provide such instruments.

For this and other objects of the invention which in part are obvious and in part will appear hereinafter I supply a matched pair of modulating lamps with direct current from a common source, augmented with alternating current from a common source, whereby alternating current of opposite phase is supplied to each lamp. Generally, incandescent lamps, gaseous discharge tubes, or fluorescent lamps are useful for the hereindisclosed purpose. The effect of this arrangement is to produce a light in each lamp which rises and falls with the alternating component of the impressed voltage; in such a way that the light from one lamp is rising while the light of the other lamp is falling and vice versa. If light from one lamp is directed at, say, a surface of a given optical value and light from the other lamp at an identical surface, and if the combined light reflected from the two surfaces is made to illuminate the photoelectric tube of an arrangement comprising a photoelectric tube, an amplifier and, say, an oscilloscope for detecting a signal, the photoelectric tube will respond to the integrated sum of light reflected from both surfaces. If, in accord with the above premise, the two surfaces are identical, they will exactly reflect the alternate rise and fall in the light emitted from the lamps and no signal will ensue, since the sum total of the light impinged upon the photoelectric tube is constant. However, if the light reflected by one of the surfaces differs in intensity from the light reflected by the other surface, the photoelectric tube will register a near sinusoidal flicker of the same frequency as the alternating current component impressed upon the incandescent lamps and the oscilloscope will indicate a signal and the phase of the signal, depending upon which of the two surfaces reflects with greater intensity. If the two surfaces are reversed in their position, a signal of the same frequency but of opposite phase will be detected.

Another way of obtaining differences in the intensity of reflected (or transmitted) light is independent of the optical characteristics of the two samples and consists in unbalancing the two light beams before they strike the samples. This will occur when the two lamps are not evenly matched and can be readily accomplished with matched incandescent lamps through the dimming of one of the light beams by inserting, say, a standard density wedge into the beam. Conversely, any unbalance in reflected or transmitted light of two samples, caused by an optical difference between the two samples, can be measurably eliminated by dimming the beam striking the lighter of the two samples.

The method of using an instrument of this type for measuring optical characteristics, for example the light reflectance of a sample in comparison with a standard, is to place the sample in a path of light emitted from one of the two lamps, place the standard in a path of light from the other lamp, observe by means of the oscilloscope whether or not there is unbalance between the light reflected from the sample and the light reflected from the standard, as well as the direction of the unbalance, and then attenuate the beam directed at the surface of higher reflectance. The degree of attenuation provides a direct measurement of the amount of light reflected by the sample in terms of light reflected by the standard.

Instead of manually attenuating one of the beams, the instrument can be automatically balanced by coupling the attenuating member, which can be a standard density wedge, or a set of polaroids, or a mechanical attenuating device, to a universal motor which is actuated by the amplified sinusoidal signals generated in the photoelectric tube whenever there is optical unbalance between the sample and the standard. According to another embodiment of the invention, the instrument is set up in such a manner that the signal generated by the photoelectric tube, after having been amplified, is used as the source supplying the alternating current component of the voltage actuating the two incandescent lamps. Either modifications has the advantage of providing a null method for the testing of optical characteristics.

Figure 2:
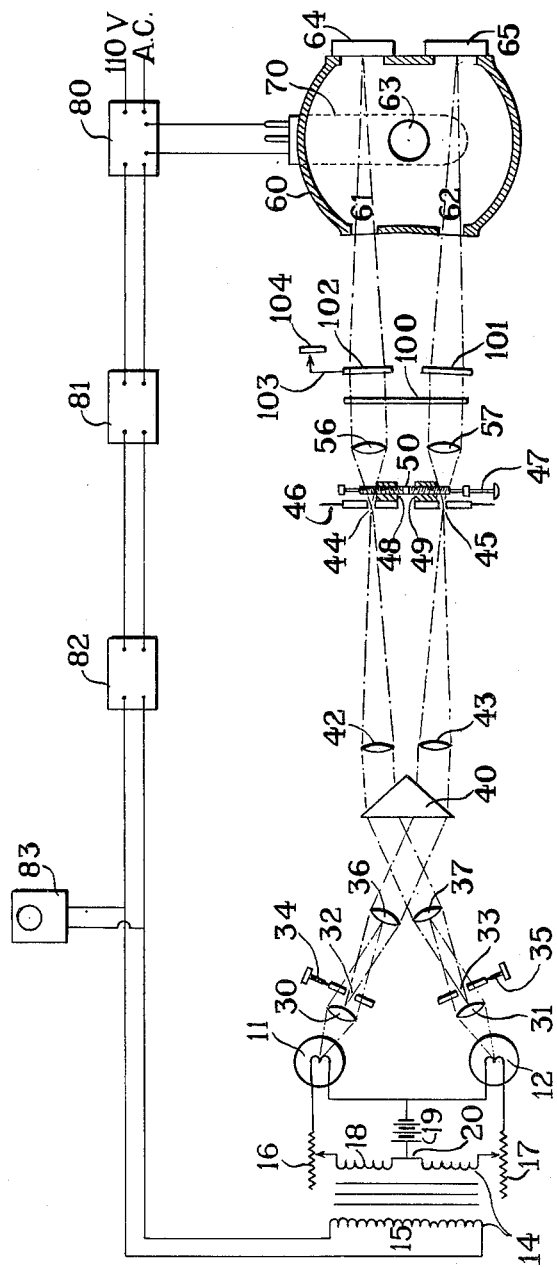

Referring to the drawing, Fig. 1 represents one embodiment of my invention which is automatically adjustable. Fig. 2 shows a modified form which is manually adjusted but where the alternating component of the voltage supplied to the lamps is derived from the amplified signals generated in the photoelectric tube.

Fig. 1 shows two incandescent light sources 11, 12, consisting of lamps having fine wire tungsten filaments enclosed in an inert, high heat conducting atmosphere, such as hydrogen, whereby a rate of cooling is attained which is desirable to provide modulation of sufficient magnitude. The lamps are connected to an energy source, consisting of a transformer 14, the primary 15 of which is connected to, say, a 110 volt A. C. power line. By means of a circuit including the resistors 16, 17, the two lamps are connected in series across the transformer secondary 18 and to one terminal of a battery 19, the other terminal of which is connected to a fixed center tap 20 of the transformer secondary. In order to achieve clean electrical modulation it is important to select the transformer and the battery in such a manner that the peak voltage of the alternating current in the transformer secondary does not substantially exceed the voltage of the direct current from the battery. Thus, a power source comprising a 6 volt battery and a transformer delivering alternating voltage from 0.4 to 1 volt has been found satisfactory. The arrangement causes the two lamps to share equally and simultaneously the direct current from the battery, but impresses them with opposite phases of alternating current.

One suitable optical system comprises the collector lenses 30, 31 and the slit plates 32, 33. At least one of the two slit plates is provided with a slit adjustment 35 to balance the light from the lamps. Such balancing may be required if, because of slight differences in the color temperatures of the lamps, an adjustment of the resistors 16, 17 had to be made. Additional parts of the optical system are the objective lenses 36, 37 which serve to focus an image of the slit at the rear wall of an integrating sphere 60, which is entered by the light beams through the ports 61, 62. A photoelectric tube 70 is placed adjacent to another port 63 of the integrating sphere. The signals generated in the photoelectric tube are amplified by means of a voltage amplifier 80, a power amplifier 81 and a phase control network 82. The amplified signals are used to operate an oscilloscope 83 and are fed to the armature circuit of a universal motor 84 which has a field winding 85 and which is coupled to a circular standard density wedge 90, constituting the photometering element. The wedge is positioned in the path of light passing from one of the slit plates, preferably in the path of light from the slit plate 32, and is provided with a per cent scale at the margin and with a fixed pointer 91; scale and pointer being arranged to cooperate with each other in such a manner that the wedge is turned to transmit the maximum amount of light when the pointer coincides with the 100 per cent mark and no light when the pointer coincides with the zero mark. In this form of my invention, if, for example, the instrument is equipped with standard white reflecting surfaces in the ports 64, 65 of the integrating sphere and after a transparent or translucent sample has been inserted in the port 62 of the integrating sphere, the angular adjustment of the standard density wedge which causes optical balance is automatically effected in accordance with the phase of the signals generated in the photoelectric tube.

The electrical impulses impressed upon the lamps are exactly opposite at balance and cancel each other out. However, since there is a slight lag in the heating and cooling of the filaments, even at balance the photoelectric tube is not impinged with a steady and uniform amount of light, but with a minute flicker which is registered as a low amplitude sinusoidal signal of higher, probably twice the frequency of the alternating current component supplied to the lamps. Any difficulties which may be caused by this signal, specifically in the determination of the point of balance, can be readily overcome by using a tuned voltage amplifier in lieu of the amplifier 80, or by a voltage amplifier with filter network.

The foregoing embodiment represents a new and improved null type instrument which is useful for measuring densities of transmission, densities of reflectance, per cent transmittance and per cent reflectance.

The modification shown in Fig. 2 comprises a monochromator (an optical system capable of producing monochromatic light). Arrangements can be made for this purpose whereby light from each of the sources 11, 12 passes through a separate dispersing prism, but I find it more practical to provide a single prism 40 which, being polished on three sides, is adapted to disperse light coming from both sources. The dispersed light emerging from adjacent sides of the prism is brought to focus by the lenses 42, 43 to form images of the slits 32, 33 at the apertures 44, 45. For the purpose of obtaining light of identical wave lengths from both sources, these apertures must be accurately positioned and must be movable toward each other to obtain monochromatic light in the violet region of the spectrum, and away from each other to obtain monochromatic light in the red region. I find a differential screw arrangement useful for instigating the respective movements. The arrangement consists of two screw bushings 48, 49 having internal threads of opposite pitch, each being attached to the base of one of the apertures. The apertures are slidingly fastened to an horizontal rail 46. A screw shaft 47, having two external threads of opposite pitch, is rotatably positioned to engage the aforementioned screw bushings. The arrangement facilitates the attachment of a scale indicating the selected wave length. For some applications it might be more desirable to reverse the location of the wavelength selecting apertures 44, 45 and the slits 32, 33.

By means of the objective lenses 56, 57 beams of monochromatic light of identical wave length are directed toward an integrating sphere 60. Prior to reaching the integrating sphere the two beams are plane polarized by means of a common polarizer 100, consisting, according to the present embodiment, of a polaroid sheet. Individual analyzer elements are provided for the two beams. The analyzer 101 is adjustably positioned with respect to the polarizer so as to produce light of the desired maximum intensity, while the analyzer 102 is rotatably mounted and provided with a pointer 103, arranged to cooperate with a suitable scale 104 in such a way that the maximum amount of light is transmitted when the pointer coincides with the 100 per cent mark on the scale.

The amplified output from the photoelectric tube 70, after passing through appropriate phase and frequency control circuits 80, 81 and 82, is connected to the primary coil 15 of the transformer 14.

One use of this embodiment of my invention is to compare surface reflectances. If a standard and a sample are inserted in the ports 64 and 65, respectively, of the integrating sphere and if the standard and the sample are optically the same, no signal is generated in the photoelectric tube since the sum of the light impinged upon the latter is constant and uniform. In the absence of a signal from the photoelectric tube there is no voltage transmitted to the transformer primary. Consequently, there is no induction in the transformer secondary and only a supply of direct current from the battery, producing unmodulated, uniform light in both lamps.

However, I find that optical differences between the standard and the sample causes oscillation of the lamps and the following is a description of what is believed to take place.

Assuming that the sample which is optically identical with the standard is replaced by another sample which has a lower reflectance at the particular wave length employed, the photoelectric tube will immediately register the difference in the sum of integrated light and generate a signal which, after amplification, will create a surge of current in the primary coil of the transformer 14. Depending upon the phasing of the circuit, the surge of induced current in the transformer secondary will add to the direct current supplied to one of the two lamps and increase the light output of this lamp, while, at the same time, the surge of induced current will subtract from the direct current supplied to the other lamp and thereby decrease the light output thereof, or vice versa. For practical purposes the phasing is advantageously regulated in such a manner that the signal increases the light output of that lamp which furnishes illumination of the sample. Accordingly, if the lamp 12 brightens for an instant in response to the initial signal, the photoelectric tube generates another signal which causes another surge of current in the transformer coils. Since this second surge of current is of the same direction, the output of lamp 12 increases still further and this process is repeated until a natural or imposed limit is reached. Limitations in the light output may be due to a variety of causes, such as the particular design of the amplifier, or the characteristics of the vacuum tubes. Upon reaching the limit there is, for an instant, no change in the combined reflected light. No signal will be generated by the photoelectric tube and the induced current will drop to zero so that again only direct current will be supplied to the lamps. The change in the ensuing light level of the lamps generates a new signal in the photoelectric tube, this time, however, in the direction opposite to that of the preceding signals. The prior phase build-up is repeated, but in the reverse direction, so that now the light output of lamp 11 increases and that of lamp 12 decreases. The result of these successive phase build-ups is an oscillation of the lamps. Under the assumed condition of phasing, the oscillation takes place whenever there is optical unbalance in favor of the standard; that is, when the reflectance of the standard exceeds the reflectance of the sample or, should sample and standard be optically alike, when the light striking the standard is more intense than the light directed at the sample.

The frequency of the oscillation depends upon the particular circuit or circuit elements. It is of importance only insofar as the hot lamp filaments must have time to cool sufficiently to register the required differences in voltage. Ordinarily, no deliberate frequency control appears to be necessary.

By rotating the Polaroid 102 the intensity of the beam from lamp 12 can be measurably diminished until balance is attained and oscillation of the lamps ceases. Theoretically, a further decrease in the illumination of the standard or the use of a standard having a lower reflectance than the sample should oppose oscillation of the lamps. When practicing my invention I find that oscillation is absent as long as the unbalance is small. However, if the unbalance becomes great, oscillation commences, at an overtone frequency, probably due to an overloading of the vacuum tubes.

In the foregoing I have illustrated a new and improved null type spectrophotometer. Without departing from the scope of the present invention, the principle thereof can be applied to other instruments, such as colorimeters or densitometers.

I claim:

1. In combination, two sources of modulated light, a transformer, circuit means including current limiting resistors, connecting the said light sources in series across the transformer secondary, a supply of unidirectional current connected to the said light sources and to a center tap of the said transformer secondary, a photoelectric tube placed to receive combined light from the said sources, an optical system between the said sources and the said photoelectric tube arranged to direct light from the said sources at the said photoelectric tube, means allowing measurable attenuation of light passing from at least one of the sources, means for amplifying signals generated by the said photoelectric tube and means for detecting such signals.

2. In combination, two sources of modulated light, a transformer, circuit means including current limiting resistors, connecting the said light sources in series across the transformer secondary, a supply of unidirectional current connected to the said light sources and to a center tap of the said transformer secondary, a photoelectric tube placed to receive combined light from the said sources, an optical system between the said sources and the said photoelectric tube arrange to direct light from the said sources at the said photoelectric tube, means allowing measurable attenuation of light passing from at least one of the sources, means for amplifying signals generated by the said photoelectric tube, and a circuit for applying the amplified signals to the primary of the said transformer.

3. In combination, two sources of modulated light, a transformer, circuit means including current limiting resistors, connecting the said light sources in series across the transformer secondary, a supply of unidirectional current connected to the said light sources and to a center tap of the said transformer secondary, a photoelectric tube placed to receive combined light from the said sources, an optical system between the said sources and the said photoelectric tube arranged to direct light from the said sources at the said photoelectric tube, means allowing measurable attenuation of light passing from one of the sources, means for amplifying signals generated by the said photoelectric tube, and a reversible electric motor actuated by the amplified signals to bring about balance of the light impinged upon the photoelectric tube by adjusting the said attenuating means.

4. In a photometric apparatus comprising an optical system directing one beam of light at a standard and another beam of light at a sample, a photometering element inserted in the path of at least one of the beams, means for mounting the sample and the standard and for integrating light passing from them, a photoelectric tube positioned to receive said integrated light, means for amplifying the signals generated by the said photoelectric tube in response to changes in the intensity of the integrated light, and means for detecting such signals and the phase of the signals, the improvement which comprises two substantially identical sources of modulated radiant energy in the visible part of the spectrum to produce the said beams of light, a transformer, circuit means including current limiting resistors connecting the said sources of radiant energy in series across the transformer secondary, and a supply of unidirectional current connected to the said sources of radiant energy and to a center tap of the said transformer secondary.

5. In a photometric apparatus comprising an optical system directing one beam of light at a standard and another beam of light at a sample, a photometering element inserted in the path of at least one of the beams, means for mounting the sample and the standard and for integrating light passing from them, a photoelectric tube positioned to receive said integrated light, and means for amplifying the signals generated by the said photoelectric tube in response to changes in the intensity of the integrated light, the improvement which comprises two substantially identical sources of modulated radiant energy in the visible part of the spectrum to produce the said beams of light, a transformer, circuit means including current limiting resistors connecting the said sources of radiant energy in series across the transformer secondary, a supply of unidirectional current connected to the said sources of radiant energy and to a center tap of the said transformer secondary, and a circuit for applying the amplified signals to the primary coil of the said transformer.

6. In a photometric apparatus comprising an optical system directing one beam of light at a standard and another beam of light at a sample, a photometering element inserted in the path of one of the beams, means for mounting the sample and the standard and for integrating light passing from them, a photoelectric tube positioned to receive said integrated light, means for amplifying the signals generated by the said photoelectric tube in response to changes in the intensity of the integrated light, and driving means for the photometering element actuated by the amplified signals, the improvement which comprises two substantially identical sources of modulated radiant energy in the visible part of the spectrum to produce the said beams of light, a transformer, circuit means including current limiting resistors connecting the said sources of radiant energy in series across the transformer secondary, and a supply of unidirectional current connected to the said sources of radiant energy and to a center tap of the said transformer secondary.

7. In a photometric apparatus comprising an optical system directing one beam of light at a standard and another beam of light at a sample, a standard density wedge inserted in the path of one of the beams for measurably attenuating the beam, a sphere having ports for mounting the sample and the standard and for integrating light passing from them, a photoelectric tube positioned adjacent to another port of said sphere to receive said integrated light, means for amplifying the signals generated by the said photoelectric tube in response to changes in the intensity of the integrated light, and a reversible electric motor actuated by the amplified signals to bring about balance of the light impinged upon the photoelectric tube by adjusting the degree of attenuation caused by the said standard density wedge, the improvement which comprises two substantially identical sources of modulated radiant energy in the visible part of the spectrum to produce the said beams of light, a transformer, circuit means including current limiting resistors connecting the said sources of radiant energy in series across the transformer secondary, and a supply of unidirectional current connected to the said sources of radiant energy and to a center tap of the said transformer secondary.

8. In a photometric apparatus comprising a common monochromator for two substantially identical beams of light, means for passing monochromatic light of a selected wave length from one of the beams at a standard and monochromatic light of the same wave length from the other beam at a sample, means for varying the wave length of the beams of monochromatic light from one end of the spectrum to the other, a photometering element inserted in the path of at least one of the said beams of monochromatic light, means for mounting the sample and the standard and for integrating light passing from them, a photoelectric tube positioned to receive said integrated light, means for amplifying the signals generated by the said photoelectric tube in response to changes in the intensity of the integrated light, the improvement which comprises a matched pair of incandescent lamps to produce the said two substantially identical beams of light, a transformer, circuit means including current limiting resistors connecting the said incandescent lamps in series across the transformer secondary, a supply of unidirectional current connected to the said incandescent lamps and to a center tap of the said transformer secondary, and a circuit for applying the amplified signals to the primary coil of the said transformer.

JOHN E. TYLER.

REFERENCES CITED

The following references are of record in the file of this patent:

UNITED STATES PATENTS

| Number | Name | Date |
| --- | --- | --- |
| 2,282,198 | Murcek | May 5, 1942 |
| 2,376,311 | Hood | May 15, 1945 |
| 2,383,075 | Pineo | Aug. 21, 1945 |
| 2,474,098 | Dimmick | June 21, 1949 |